(12) United States Patent
Chen

(10) Patent No.: US 8,821,084 B2
(45) Date of Patent: Sep. 2, 2014

(54) TOOL HOLDING MODULE

(75) Inventor: Peter Chen, Taoyuan County (TW)

(73) Assignee: Primetool MFG, Inc., Taoyuan County (TW)

( * ) Notice: Subject to any disclaimer, the term of this patent is extended or adjusted under 35 U.S.C. 154(b) by 1147 days.

(21) Appl. No.: 12/645,100

(22) Filed: Dec. 22, 2009

(65) Prior Publication Data

US 2010/0096814 A1 Apr. 22, 2010

Related U.S. Application Data

(63) Continuation-in-part of application No. 11/812,735, filed on Jun. 21, 2007, now abandoned.

(51) Int. Cl.
*B23B 31/08* (2006.01)
*B23B 31/10* (2006.01)
*B23B 31/02* (2006.01)
*B23B 31/11* (2006.01)
*B23B 31/20* (2006.01)

(52) U.S. Cl.
CPC ............ *B23B 31/02* (2013.01); *B23B 2270/12* (2013.01); *B23B 31/11* (2013.01); *B23B 2260/016* (2013.01); *B23B 31/20* (2013.01)
USPC .......................................... 409/232; 409/234

(58) Field of Classification Search
CPC ............ B23B 2331/04; B23B 2331/14; B23B 2331/20; B23B 2331/44
USPC .......... 409/234, 239 A, 232, 141; 408/239 A, 408/239 R, 238, 143
See application file for complete search history.

(56) References Cited

U.S. PATENT DOCUMENTS

| 243,978 | A | * | 7/1881 | Rominger ........................ 279/36 |
| 493,231 | A | * | 3/1893 | Muir .............................. 279/49 |
| 693,256 | A | | 2/1902 | Furbish |
| 1,160,042 | A | * | 11/1915 | Carpenter .................... 408/156 |
| 1,372,482 | A | | 3/1921 | Henry |
| 1,409,311 | A | | 3/1922 | Olson |
| 1,953,637 | A | * | 4/1934 | Smith et al. .................. 279/56 |
| 2,469,014 | A | * | 5/1949 | Stalhandske ................ 279/49 |
| 2,683,041 | A | | 7/1954 | Stone |

(Continued)

FOREIGN PATENT DOCUMENTS

| DE | 2831660 | 3/1979 |
| DE | 20012246 | 3/2001 |

(Continued)

*Primary Examiner* — Kenneth E. Peterson
*Assistant Examiner* — Jennifer Swinney
(74) *Attorney, Agent, or Firm* — Chun-Ming Shih

(57) ABSTRACT

A tool holding module comprises a fixture seat and a tool rod. The fixture seat has a first outer surface on an external wall, a first top surface on one end, and a fixture head is located on the same end. The fixture head has a second outer surface on an external wall and a second top surface on one end. The internal wall of the tool rod has first and second inner surfaces respectively corresponding to the first and second outer surfaces, and has first and second butting surfaces respectively corresponding to the first and second top surfaces. The tool rod and fixture seat are connected to enfold the fixture head. The security of the tool holding module is enhanced via close contact of the first outer and inner surfaces, the second outer and inner surfaces, the first top and butting surfaces, the second top and butting surfaces.

7 Claims, 7 Drawing Sheets

(56) References Cited

U.S. PATENT DOCUMENTS

| | | | |
|---|---|---|---|
| 3,679,220 A | | 7/1972 | Reeves |
| 3,719,367 A | * | 3/1973 | Baturka ................. 279/145 |
| 3,765,074 A | | 10/1973 | Payne |
| 3,879,046 A | | 4/1975 | Alford |
| 4,496,163 A | | 1/1985 | Bernfeld |
| 4,570,952 A | * | 2/1986 | Heimbigner et al. ........... 279/20 |
| 4,602,798 A | | 7/1986 | Wettstein |
| 4,668,138 A | | 5/1987 | Carter |
| 4,722,645 A | | 2/1988 | Regan |
| 4,865,336 A | | 9/1989 | Keritsis |
| 5,096,213 A | | 3/1992 | Terwilliger et al. |
| 5,340,127 A | | 8/1994 | Martin |
| 5,524,909 A | * | 6/1996 | Wyatt ............................. 279/50 |
| 5,593,258 A | | 1/1997 | Matsumoto |
| 5,758,883 A | * | 6/1998 | Brian ............................. 279/53 |
| 6,371,705 B1 | | 4/2002 | Gaudreau |
| 6,517,299 B1 | * | 2/2003 | Lin ................................ 409/234 |
| 6,601,857 B1 | | 8/2003 | Richmond |
| 7,334,970 B2 | * | 2/2008 | Kozak ........................... 408/240 |
| 8,308,405 B2 | * | 11/2012 | Chen ............................. 409/234 |
| 2007/0031205 A1 | | 2/2007 | Guy |

FOREIGN PATENT DOCUMENTS

| | | |
|---|---|---|
| DE | 20012246 U1 * | 3/2001 |
| JP | 57184610 | 11/1982 |
| JP | 60191734 A * | 9/1985 |
| JP | 2002059305 | 2/2002 |
| TW | M253434 | 12/2004 |

* cited by examiner

TOOL HOLDING MODULE

This application is a continuation-in-part, and claims priority, of from U.S. patent application Ser. No. 11/812,735 filed on Jun. 21, 2007, now abandoned entitled "TOOL HOLDING MODULE".

FIELD OF THE INVENTION

The present invention relates to a tool holding module, particularly to a tool holding module which can promote machining stability.

BACKGROUND OF THE INVENTION

At present, high-precision metal machining, such as drilling, reaming, boring, thread milling, inner/outer diameter drilling, or surface grinding, is usually processed by a CNC (Computer Numerical Control) machining table together with various cutters or tools. A cutter or tool has a long handle gripped by a gripper or a grip mechanism, whereby the cutter or tool can be coupled to a driving shaft of a CNC table. Thus, the driving shaft rotating at a high speed can drive the cutter or tool gripped by a gripper to machine a target workpiece.

A R.O.C. patent No. M253434 disclosed a "Detachable Tool Fixture", which comprises a tool rod, a grip member and a fixing member. The tool rod has a coned hole extending inward along the axis from one end thereof with its diameter gradually contracting from the rim to the interior. The grip member has a cone portion at one end thereof and a sleeved portion at the other end. The tilt angle of the cone portion is identical to that of the coned hole. The cone portion is arranged inside the coned hole. The sleeved portion has a central hole fixing a tool with a heating method. The fixing member sleeves the grip member and is coupled to the tool rod with a screwing method, and the grip member is thus secured to the tool rod. The objective of the conventional technology is to utilize a single tool rod to grip different-specification tools. However, the conventional technology still has some problems. In the conventional technology, the fixing member is used to sleeve the grip member and coupled to the end of the tool rod with a screwing method to enhance the coupling between the grip member and the tool rod; thus, the user has to rotate the fixing member in assembling or disassembling, which inconveniences the user.

SUMMARY OF THE INVENTION

The primary objective of the present invention is to provide a tool holding module, which increases machining stability via improving the coupling force and concentricity between the fixture seat and the tool rod and can thus prevent a tool from damage or losing precision when the tool is machining a target metal.

To achieve the abovementioned objective, the present invention proposes a tool holding module, wherein a hollow fixture seat and a hollow tool rod are integrated to form a holding module. The fixture seat has a first outer surface on the external wall thereof, a first top surface on one end thereof, and a fixture head is formed on the same end of the fixture seat. The fixture head has a second outer surface on the external wall thereof and a second top surface on one end thereof. The tool rod and the fixture seat are connected to each other and enfold the fixture head. The internal wall of the tool rod has a first inner surface and a second inner surface respectively corresponding to the first outer surface and the second outer surface. The tool rod also has a first butting surface and a second butting surface inside respectively corresponding to the first top surface and the second top surface. The firmness of the tool holding module is enhanced via the close contact of the first outer surface and first inner surface, the second outer surface and second inner surface, the first top surface and first butting surface, the second top surface and second butting surface. Thereby, the tool holding module of the present invention becomes more secure and robust and can maintain the concentricity between the fixture seat and the tool rod. Therefore, the present invention can prevent the tool from vibration, damage, or falling off and can thus increase machining precision and service life. Besides, the prevent invention also provides various assembly interfaces for different fixture seats and tool rods.

DETAILED DESCRIPTION OF THE PREFERRED EMBODIMENTS

Below, the technical contents of the present invention are described in detail in cooperation with the drawings.

Figure 1:
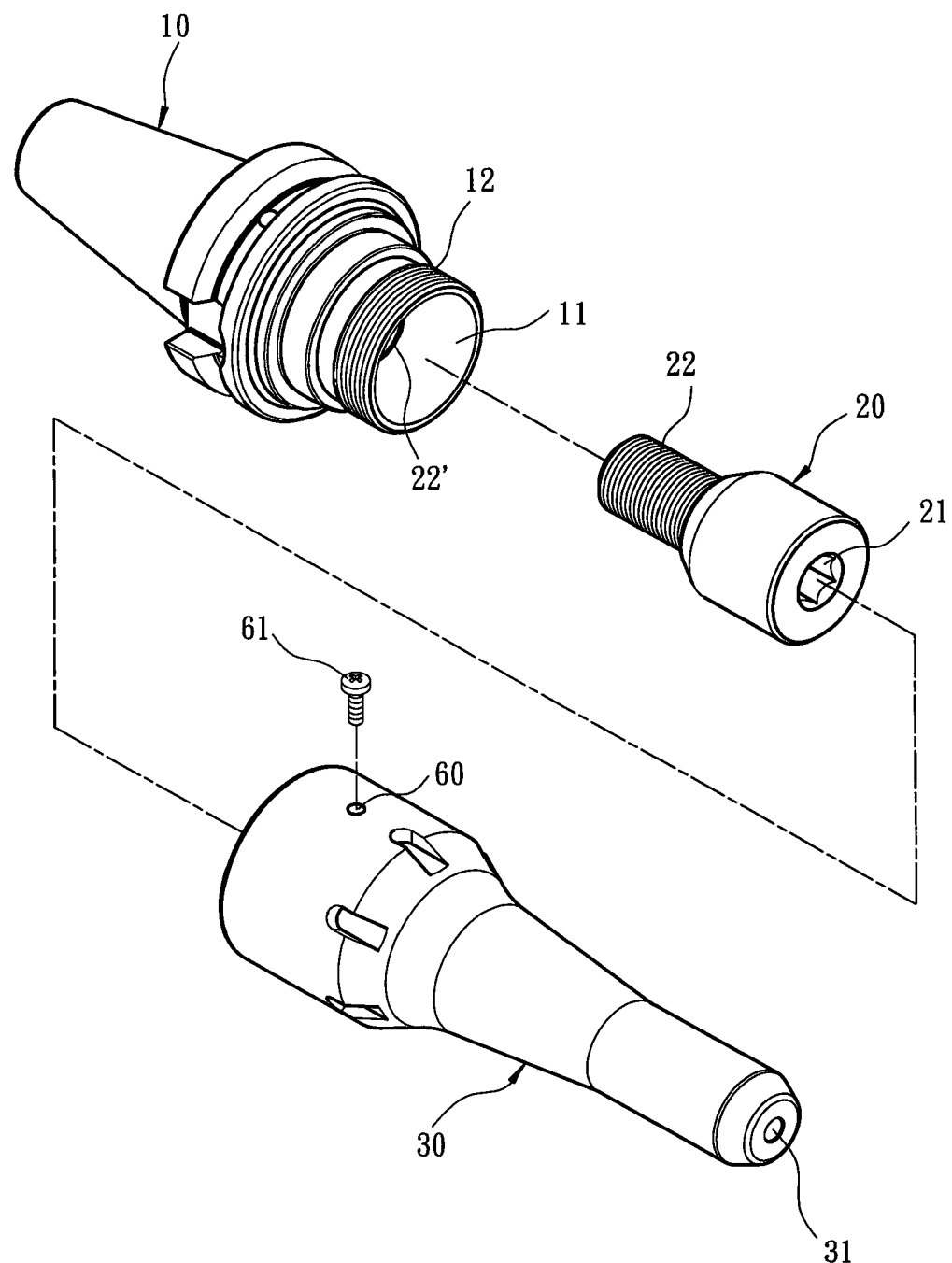
FIG. 1 is a perspective exploded view schematically showing the tool holding module according to one embodiment of the present invention.
Figure 2:
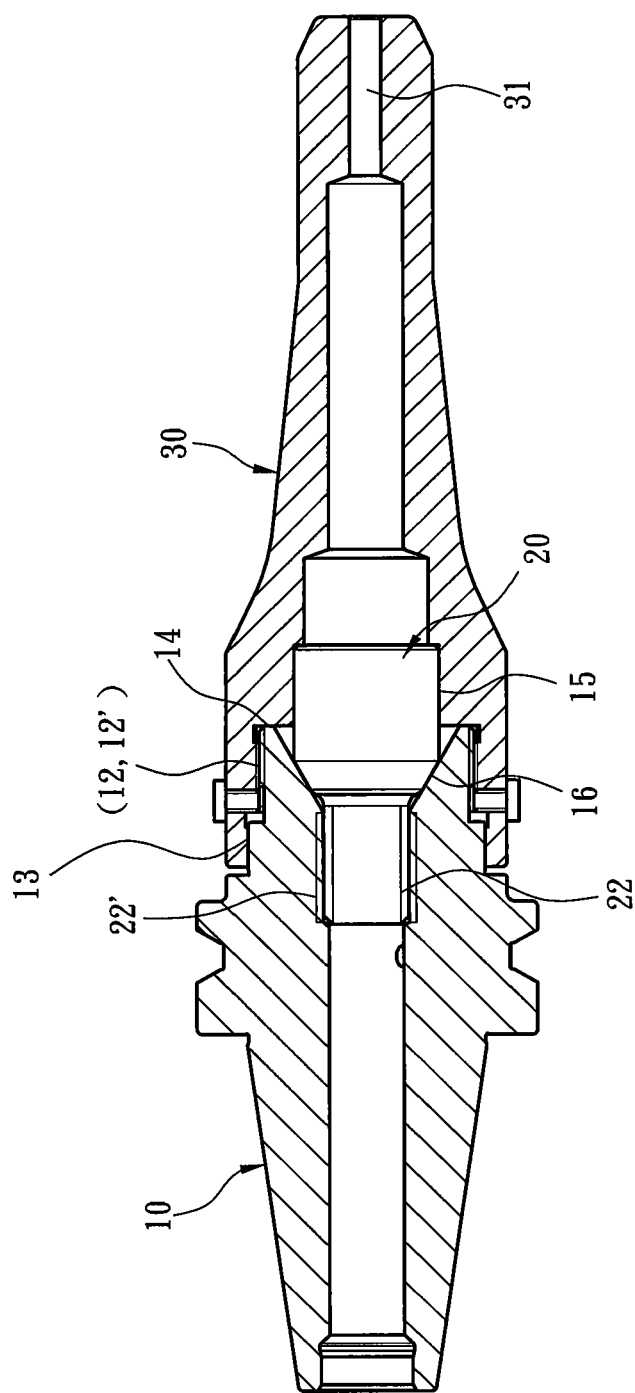
FIG. 2 is a sectional view schematically showing the tool holding module according to one embodiment of the present invention.

Refer to FIG. 1 and FIG. 2 respectively a perspective exploded view and a sectional view schematically showing the tool holding module according to one embodiment of the present invention. The present invention is integrated with a driving shaft (not shown in the drawings) and is used to couple a machining cutter or tool to a machining table (not shown in the drawings), wherein the driving shaft of the machining table drives the machining cutter or tool to rotate at a high speed and machine a target workpiece (not shown in the drawings). The tool holding module of the present invention comprises a fixture seat 10 and a tool rod 30. An about pillar-like fixture head 20 is arranged at the connection region of the fixture seat 10 and the tool rod 30. The fixture head 20 is accommodated in a first accommodation room 11 of the fixture seat 10 and enfolded by the tool rod 30. The fixture seat 10 is tightly coupled to the fixture head 20 via first connection members 22 and 22' and is tightly coupled to the tool rod 30 via second connection members 12 and 12'. The fixture seat 10, the fixture head 20 and the tool rod 30 are tightly coupled at the contact interfaces 13, 14, 15, and 16, and the fixture head 20 is enfolded by the tool rod 30. Thereby, the tool holding module of the present invention becomes more secure and robust and can maintain the concentricity between the fixture seat 10 and the tool rod 30, which can avoid the detachment of the tool rod 30 from the fixture seat 10 and can prevent from the machining precision degradation caused by the tool loosening resulting from insufficient concentricity or coupling force.

The fixture head 20 may have an auxiliary installation hole 21; an appropriate instrument (not shown in the drawings) may be inserted into the auxiliary installation hole 21 to assist in installing the fixture head 20 into the first accommodation room 11 of the fixture seat 10. The first connection members 22 and 22'/the second connection members 12 and 12' may be a pair of threads matching each other. The second connection member 12 and 12' may have at least one tapped hole 60, and a screw bolt 61 can be screwed into the tapped hole 60 to enhance the coupling security between the fixture seat 10 and the tool rod 30. The fixture seat 10, the fixture head 20 and the tool rod 30 are all hollow, and an installation tunnel 31 is formed thereinside, and a cutter or tool is inserted into the installation tunnel 31 for installation. The length by which the cutter or tool emerges from the tool holding module can be regulated via adjusting the length by which the cutter or tool is inserted into the installation tunnel 31.

Figure 3:
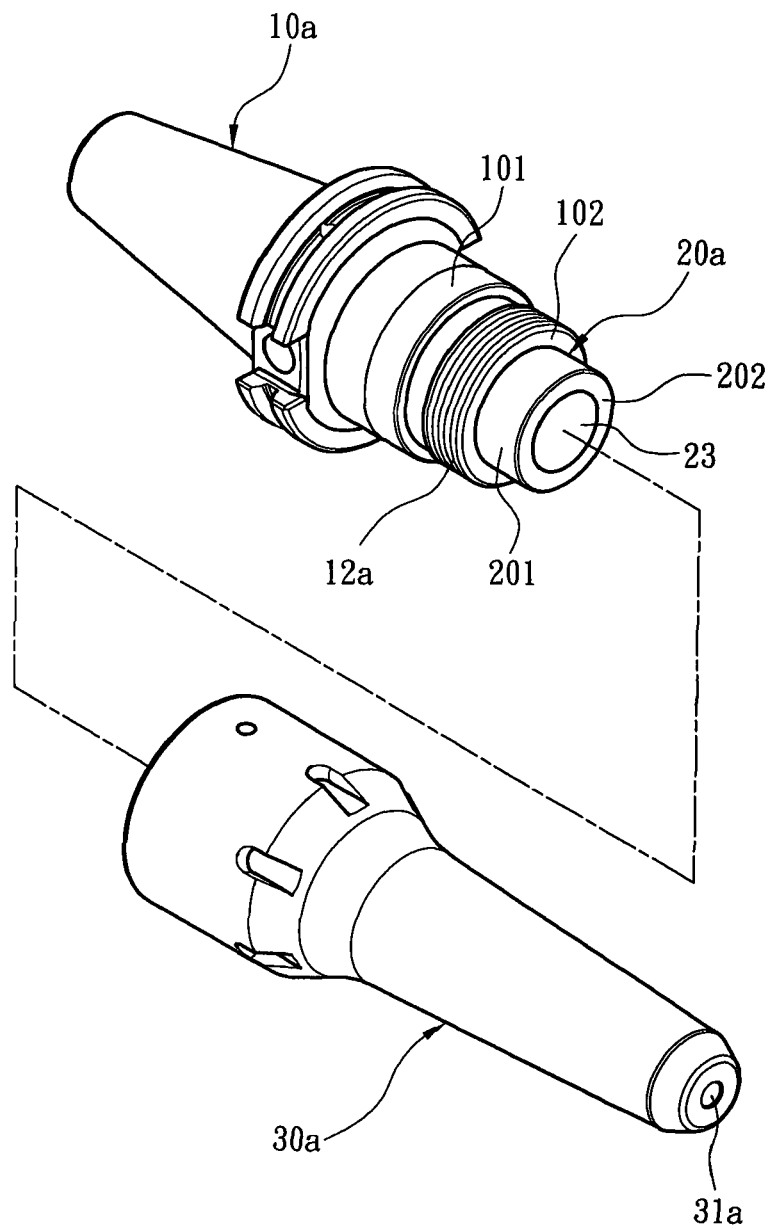
FIG. 3 is a perspective exploded view schematically showing the tool holding module according to another embodiment of the present invention.
Figure 4:
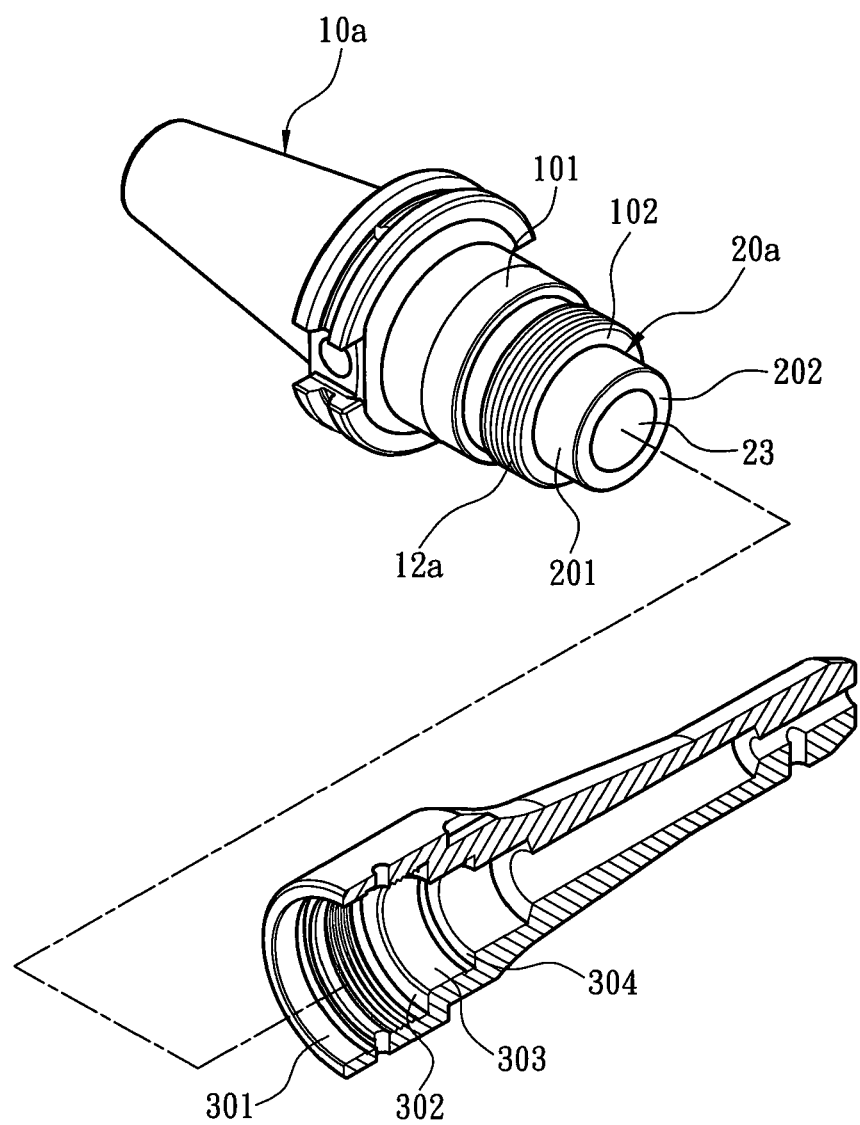
FIG. 4 is another perspective exploded view schematically showing the tool holding module according to another embodiment of the present invention.
Figure 5:
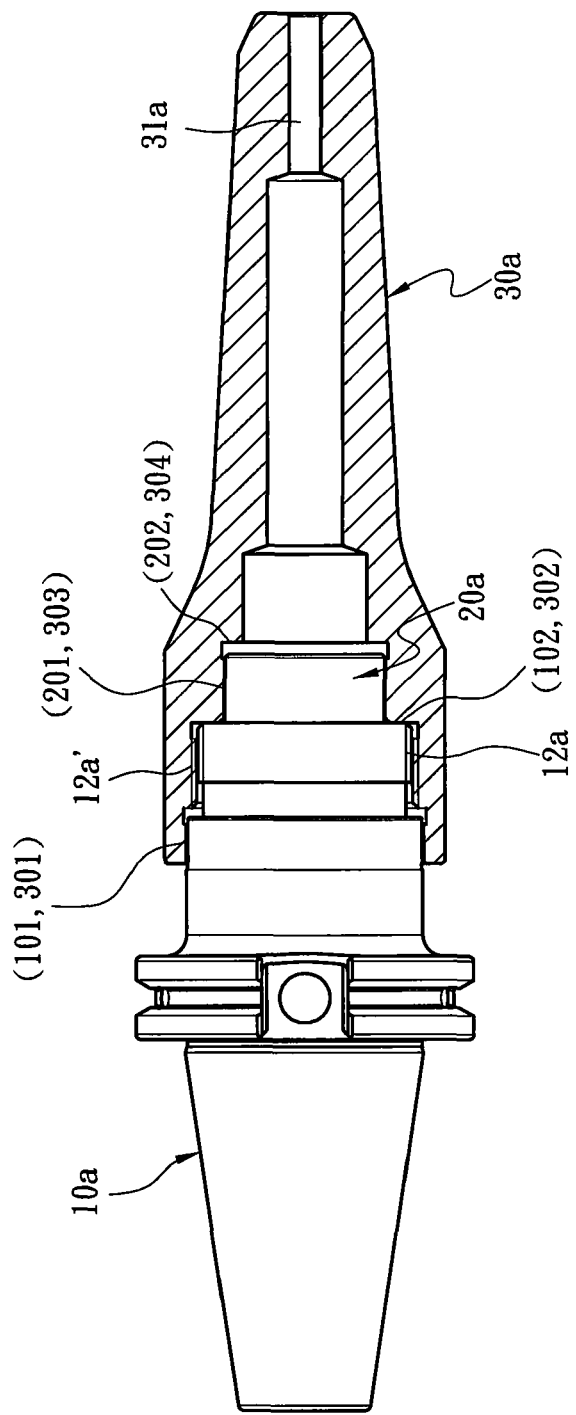
FIG. 5 is a sectional view schematically showing the tool holding module according to another embodiment of the present invention.

Refer to FIG. 3, FIG. 4 and FIG. 5 respectively perspective exploded views and a sectional view schematically showing the tool holding module according to another embodiment of the present invention. This embodiment has a fixture seat 10a and a fixture head 20a, which are fabricated into a one-piece component, whereby the time to install the fixture head 20a into the fixture seat 10a is saved. As shown in the drawings, the external wall of the fixture seat 10a has a first outer surface 101; one end of the fixture seat 10a has a first top surface 102, and the fixture head 20a is located on the same end. The external wall of the fixture head 20a has a second outer surface 201, and one end of the fixture head 20a has a second top surface 202. In this embodiment, the first outer surface 101 is vertical to the first top surface 102; the second outer surface 201 is vertical to the second top surface 202; the first top surface 102 is vertical to the second outer surface 201.

In this embodiment, the internal wall of a tool rod 30a has a first inner surface 301 and a second inner surface 303 respectively corresponding to the first outer surface 101 and the second outer surface 201. The tool rod 30a also has a first butting surface 302 and a second butting surface 304 inside respectively to the first top surface 102 and the second top surface 202. When the tool rod 30a is connected with the fixture seat 10a via second connection members 12a and 12a', the fixture seat 10a, fixture head 20a and tool rod 30a are securely coupled via the close contact of the first outer surface 101 and first inner surface 301, the second outer surface 201 and second inner surface 303, the first top surface 102 and first butting surface 302, the second top surface 202 and second butting surface 304. Thereby is formed a firm structure. The tool rod 30a is hollow, and an installation tunnel 31a is formed thereinside. The fixture head 20a has an installation hole 23. A cutter or tool is inserted into the installation tunnel 31a and installation hole 23 and installed in the tool holding module.

Figure 6:
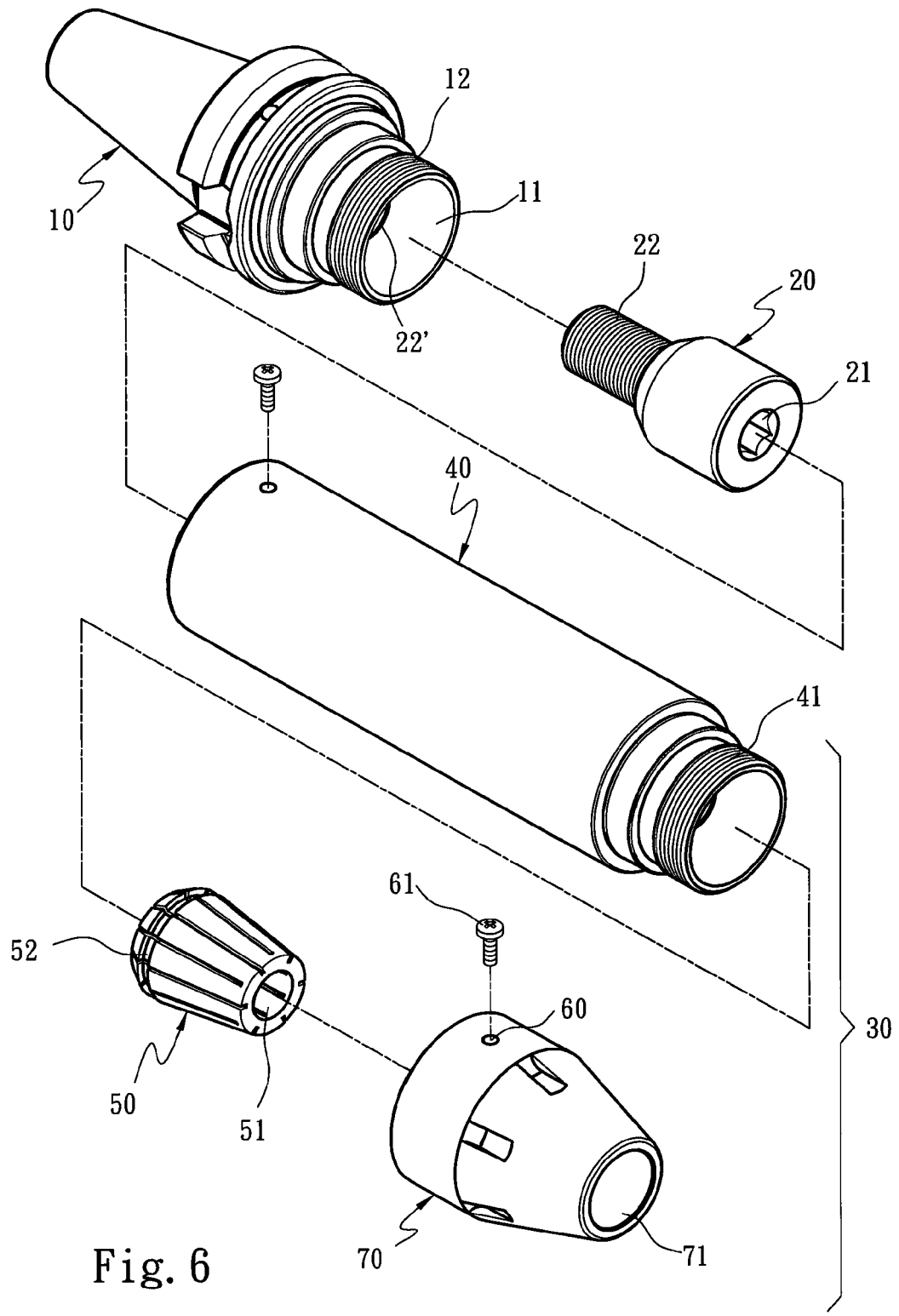
FIG. 6 is a perspective exploded view schematically showing the tool holding module according to a further embodiment of the present invention.
Figure 7:
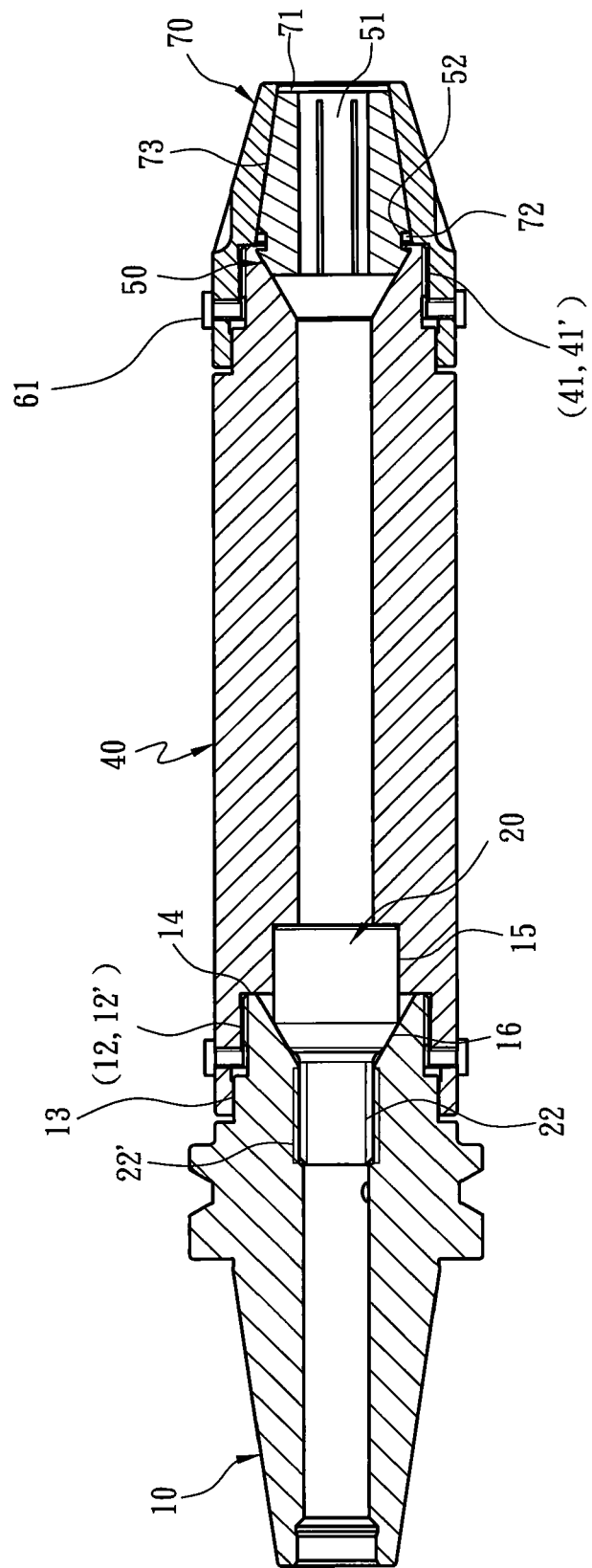
FIG. 7 is a sectional view schematically showing the tool holding module according to a further embodiment of the present invention.

Refer to FIG. 6 and FIG. 7 respectively a perspective exploded view and a sectional view schematically showing the tool holding module according to a further embodiment of the present invention. As shown in FIG. 6 and FIG. 7, in this embodiment, the tool rod 30 further comprises an extension rod 40, a grip member 50 and a nut 70. The fixture seat 10 is tightly coupled to the fixture head 20 via the first connection members 22 and 22' and is tightly coupled to one end of the extension rod 40 via the second connection members 12 and 12'; thus, the extension rod 40 enfolds the fixture head 20 thereinside. The grip member 50 is accommodated inside a second accommodation room 73 of the nut 70. The grip force of the grip member 50 is enhanced via the cooperation of an annular trench 52 of the grip member 50 and an annular fixing member 72 of the nut 70. The grip member 50 has a plurality of claw plates periodically and annularly arranged to form a cone-like claw structure 51. The other end of the extension rod 40 is tightly coupled to the nut 70 via third connection members 41 and 41'. Thus, the grip member 50 is tightly secured thereinside, and the extension rod 40 is fixedly installed between the fixture seat 10 and the nut 70.

The third connection members 41 and 41' may also be a pair of threads matching each other and have at least one tapped hole 60, and a screw bolt 61 can be screwed into the tapped hole 60 to enhance the coupling security between the extension rod 40 and the nut 30. The fixture seat 10, the fixture head 20, the extension rod 40, the grip member 50 and the nut 70 are all hollow, and an installation tunnel 71 is formed thereinside, and a cutter or tool is inserted into the installation tunnel 71 for installation. The length by which a cutter or tool emerges from the tool holding module can be regulated via adjusting the length by which the cutter or tool is inserted into the installation tunnel 71. Then, the cutter or tool is fixed by the grip member 50. The cone-like claw structure 51 provides the grip member 50 with the flexibility to hold different-specification cutters or tools. When a cutter or tool is inserted into the cone-like claw structure 51, the inner diameter of the cone-like claw structure 51 can be adjusted appropriately to meet the cutter or tool. After the grip member 50 is coupled to the extension rod 40, the claw structure 51 will contract inward and grip the cutter or tool tightly while the nut 70 is coupled to the extension rod 40, which can prevent the cutter or tool from loosening at a high rotation speed. The cutter or tool is tightly gripped by the grip member 50, and only a small portion of the cutter or tool is exposed outside; therefore, the influence of external force is reduced, and the machining precision is greatly promoted when the cutter or tool machines a target workpiece.

Those described above are only the preferred embodiments to exemplify the present invention but not to limit the scope of the present invention. Any equivalent modification or variation according to the spirit of the present invention is to be also included within the scope of the present invention.

What is claimed is:

1. A tool holding module, comprising:
   a first one-piece component, comprising:
   a fixture seat including a first outer surface and a first thread portion parallel to the first outer surface that are formed on an external wall thereof, and an unthreaded surface being formed on the external wall of the fixture seat between the first outer surface and the first thread portion, the first outer surface being formed at a first diameter and the first thread portion being formed at a second diameter smaller than the first diameter, wherein the fixture seat further includes a first top surface formed on an end thereof, and the unthreaded surface has a third diameter smaller than the first diameter; and
   a fixture head disposed at the end of the fixture seat where the first top surface is formed, the fixture head including a second outer surface formed on an external wall thereof and a second top surface formed on a distal end of the first one-piece component; and
   a second one-piece component comprising a tool rod including a second thread and being coupled to the first thread portion of the fixture seat to enfold the fixture head, the tool rod further including a first inner surface and a second inner surface that are formed on an internal wall thereof and respectively corresponding to the first outer surface and the second outer surface, and including a first butting surface and a second butting surface inside and respectively corresponding to the first top surface and the second top surface, whereby the tool rod, the fixture head and the fixture seat are firmly coupled via close contact of the first outer surface and the first inner surface, the second outer surface and the second inner surface, the first top surface and the first butting surface, and the second top surface and the second butting surface, and whereby a distal end of the tool rod enfolds the first outer surface of the fixture seat at the position having the first diameter to promote concentricity of the fixture seat and the tool rod.

2. The tool holding module according to claim 1, wherein the first outer surface is vertical to the first top surface.

3. The tool holding module according to claim 1, wherein the second outer surface is vertical to the second top surface.

4. The tool holding module according to claim 1, wherein the first top surface is vertical to the second outer surface.

5. The tool holding module according to claim 1, wherein the fixture seat and the fixture head are fabricated into a one-piece component.

6. The tool holding module according to claim 1, wherein the fixture head includes an installation hole where a tool is inserted for installation.

7. The tool holding module according to claim 1, wherein an accommodation room is formed between the fixture seat and the tool rod to receive the fixture head and completely enfold the fixture head.

* * * * *